United States Patent [19]

Amano

[11] Patent Number: 4,940,339
[45] Date of Patent: Jul. 10, 1990

[54] ENDLESS RECTILINEAR MOTION ROLLING GUIDE UNIT

[75] Inventor: Juichi Amano, Yokohama, Japan

[73] Assignee: Nippon Thompson Co., Ltd., Tokyo, Japan

[21] Appl. No.: 184,384

[22] Filed: Apr. 21, 1988

[30] Foreign Application Priority Data

Dec. 22, 1987 [JP] Japan .................. 62-194729[U]

[51] Int. Cl.$^5$ .............................................. F16C 29/06
[52] U.S. Cl. ........................................ 384/25; 384/39; 384/40; 384/42; 384/44
[58] Field of Search .................. 384/25, 44, 39, 40, 384/45, 43, 42

[56] References Cited

U.S. PATENT DOCUMENTS

| | | | |
|---|---|---|---|
| 4,643,591 | 2/1987 | Schwarz | 384/44 |
| 4,662,762 | 5/1987 | Schwarz | 384/25 |
| 4,730,945 | 3/1988 | Luther et al. | 384/44 |
| 4,773,770 | 9/1988 | Osawa et al. | 384/45 |

Primary Examiner—Lenard A. Footland
Attorney, Agent, or Firm—Rogers & Killeen

[57] ABSTRACT

An endless rectilinear motion rolling guide unit is provided, consisting of a track rail, a slide unit straddling said track rail and a plurality of cylindrical rollers intervened between the two members, so that said slide unit can make a rectilinear movement on said track rail. A slide bearing holding member having an inwardly and gradually decreasing height toward its one end is provided in a recess having the complementary cavity configuration that is in turn provided on the bottom wall surface of said slide unit. A friction member is secured onto the bottom surface of said slide bearing holding member in slide contact relation with the underlying track rail and the friction member can be longitudinally displaceable in the recess of the slide unit so as to adjust the contact pressure between the friction member and the underlying surface of the track rail due to wedging action deriving from the particular configuration of the insert relative to that of the recess receiving it.

2 Claims, 3 Drawing Sheets

ENDLESS RECTILINEAR MOTION ROLLING GUIDE UNIT

BACKGROUND OF THE INVENTION

1. Field of the Invention

The present invention relates to an endless rectilinear motion rolling guide unit that is suitably used in the sliding parts of various cutting machine tools, especially of heavy load cutting machine tools.

2. Description of the Prior Art

An endless rectilinear motion rolling guide unit was disclosed by Japanese Patent Application Disclosure No. 116119-1986 utilizing not only rolling friction but also sliding friction to a great extent so that without harming efficient rolling characteristics, it can greatly reduce vibration of machine. In the prior art rectilinear motion rolling unit, use was made, as rolling friction element, of a plurality of balls, while a friction member was used as sliding friction member that was pressed under spring force against the underlying track rail member on which the slide unit moves.

Due to such a spring pressure-type construction as mentioned above, the pressure applied onto the slide friction member and thus onto the track rail member could not be greatly enhanced, therefore when the generated mechanical vibration became greater, the slide friction member could not give rise to any marked reduction effect thereon.

Further, when use was made, as rolling friction member, of cylindrical rollers in a rectilinear motion rolling guide unit, the braking power generated by such a spring pressure-type sliding friction member was too small to effectively reduce the vibration.

SUMMARY OF THE INVENTION

The object of the present invention is therefore to provide an endless rectilinear motion rolling guide unit capable of not only eliminating the above-mentioned disadvantages inherent in the prior art rectilinear motion rolling guide unit but also providing the most appropriate slide friction means to be used even for a rectilinear motion rolling guide unit using rollers as rolling friction means.

A further object of the present invention is to provide a rectilinear motion rolling guide unit wherein an effective rolling friction is combined with an effective slide friction.

A further object of the present invention is to provide a rectilinear motion rolling guide unit wherein the slide friction member provided on the slide unit can strongly press against the upper portion of the underlying track rail so as to greatly reduce mechanical vibration of the unit.

A further object of the present invention is to provide a rectilinear motion rolling guide unit utilizing a wedge-type breaking means, as slide friction member, thereby enabling to enlarge the contact area between the friction member of the slide unit and the underlying track rail, thus not only reducing the pressure applied onto the track rail while giving rise to a sufficient braking power but also enhancing precise controllability of the friction pressure.

A further object of the present invention is to provide a rectilinear motion rolling guide unit capable of exhibiting an unexpectedly great braking power even when use is made of a roller friction slide bearing.

A further object of the present invention is to provide a rectilinear motion rolling guide unit capable of easily and simply adjusting the friction pressure applied between the friction member holder insert of the slide unit and the underlying upper surface of the track rail, while realizing a precise and simple adjustment of the gap between the friction member of the slide unit and the underlying upper surface of the track rail.

A further object of the present invention is to provide a rectilinear motion rolling guide unit that can be simply manufactured at low costs.

To attain the above-mentioned objects, the rectilinear motion rolling guide unit according to the present invention has the following constructions as its essential requirements:

(1) A rectilinear motion rolling guide unit comprising an elongated track rail having, on each of its sidewalls, longitudinally extending trackway means, a slide unit having a recess with an inverted U-shaped cross section in which the upper portion of said track rail is slidably inserted, on each of the inner sidewall surfaces of said recess being formed trackway means in facing relation with the above-mentioned track-rail side trackway means, and a plurality of cylindrical rollers present between the facing track-rail side and slide-unit side trackway means, which guide unit is characterized in that said slide unit includes a casing and opposing side panels fitted onto the opposing open ends of said casing with the inner sidewalls thereof being provided with the above-mentioned slide unit-side trackway means, while on the bottom surface of said casing forming a horizontal surface of said recess of the slide unit is provided a generally rectangular-shaped recess with an inwardly and gradually decreasing depth along the sliding direction of the slide unit relative to said track rail, a slide bearing holder insert having a L-shaped cross section is inserted and secured within said generally rectangular-shaped recess of the slide unit, said insert consisting of an upright flange portion at one end and a portion having a gradually decreasing height toward the other end so as to snugly conform to the above-mentioned recess of the slide unit having an inwardly and gradually decreasing depth so that said insert may be snugly fitted and secured into said rectangular-shaped recess of slide unit in a position displaceable relation with said recess along the sliding direction of said slide unit relative to said track rail, and a slide friction member is provided on the bottom surface of said L-shaped slide bearing holder insert.

(2) The rectilinear motion rolling guide unit as stated in the above (1), wherein a plurality of holes are provided in said upright flange portion of said slide bearing holder insert, while screw holes in the number corresponding to the number of and at positions aligned with said holes of the upright flange portion are provided in the end wall of said casing with a plurality of position control screws being inserted therewithin so as to control the position of said slide bearing in the recess of the slide unit along the sliding direction of said slide unit relative to said track rail.

DESCRIPTION OF THE PREFERRED EMBODIMENT

Figure 1:
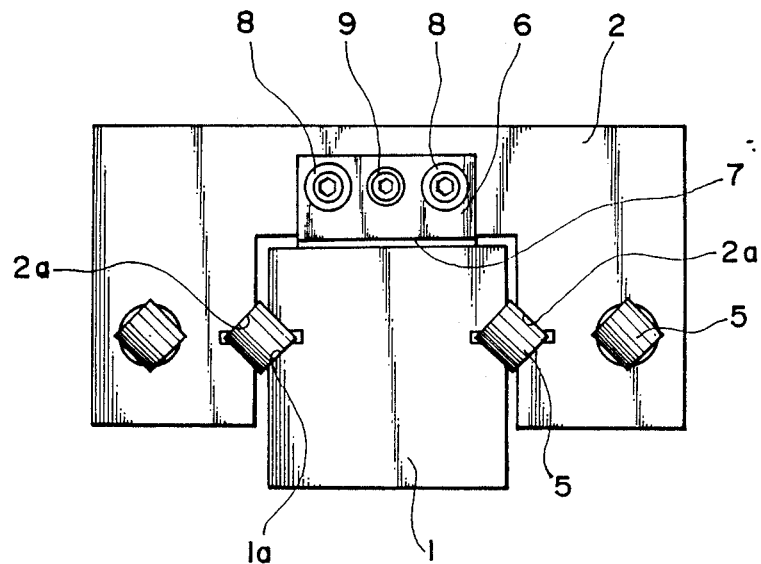
FIG. 1 is a frontal view of the present rectilinear motion rolling guide unit with the side plate of the slide unit having been removed for clarifying the relative positions of load trackways and ball return bores formed therein.

Referring now to the drawings, FIG. 1 is a frontal view of the present rectilinear motion rolling guide unit wherein a side plate normally is fitted onto each of the opposing open ends of the slide unit 2 but it has been removed in FIG. 1 to clearly show how the endless circulation loops for rollers are arranged in the unit.

Figure 5:
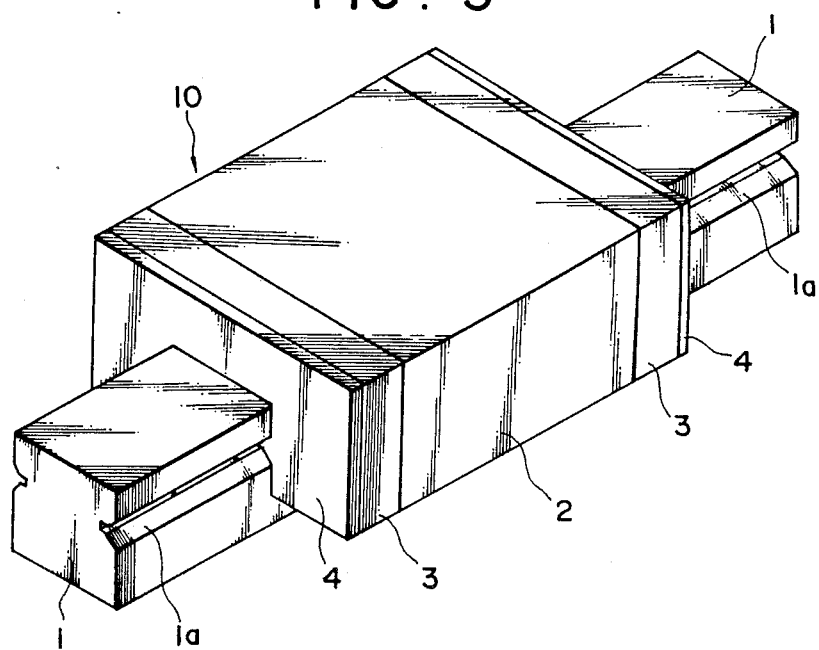
FIG. 5 is a perspective view of the whole appearance of the present rectilinear motion rolling guide unit.

In FIG. 5 is illustrated a perspective view of one of the preferred embodiments of present invention including a track rail 1, on each of the sidewall surfaces of which is formed one load trackway 1a, totalling two trackways on both sidewalls. This particular structure is simple, yet high in mechanical strength.

As illustrated in FIG. 5, the track rail 1 has an elongated shape with a pair of load trackway grooves is being formed on both sidewalls as mentioned above and a slide unit 10 having, on the bottom surface, an inverted U-shaped recess straddle the track rail 1 with the upper portion of the track rail 1 being snugly inserted within said recess.

The slide unit, in more details, consists of a casing 2, as shown in FIG. 1, opposing side plates 3 fitted onto the opposing open ends thereof and seal members 4 fitted onto the outer surfaces of said side plates 3.

Referring to FIG. 1, a plurality of rollers 5 present between the facing load trackways 1a and 2a move into the adjacent ball turning path (not shown), then return to the return bore 5 and again turn round back to the facing load trackways 1a and 2a so as to form an endless roller circulation loop.

The rollers 5 each have a cylindrical shape and they are arranged in a cross roller fashion with the longitudinal axes of adjacent rollers point at different directions by 90°, so that only with two load trackways on both sides of the track rail 1, any load from every direction can be effectively borne.

On the bottom surface of the casing 2 is further formed a recess 2b facing the underlying upper surface of the track rail 1, said recess 2b having a generally rectangular shape with its longitudinal axis being directed along the direction in which said slide unit moves on the track rail 1 and its longitudinal cross section gradually decreasing the height toward its inward direction. The said rectangular shaped recess 2b is adapted to receive a slide bearing holder insert 6 having a gradually L-shaped cross section with a configuration generally complementary to said recess 2b excepting an upright flanged portion 6d provided at the outward end portion thereof. On the bottom surface of said L-shaped insert 6 is secured a film-like friction member 7 preferably over the whole length and width of the insert 6 in a facing relation with the upper surface of the underlying track rail 1.

Figure 2:
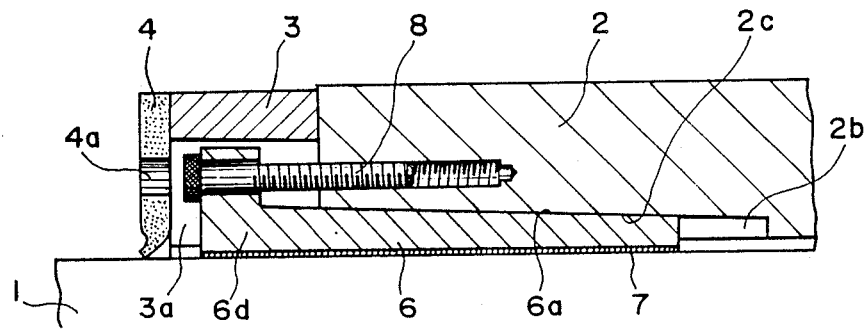
FIG. 2 is a side view of FIG. 1.
Figure 3:
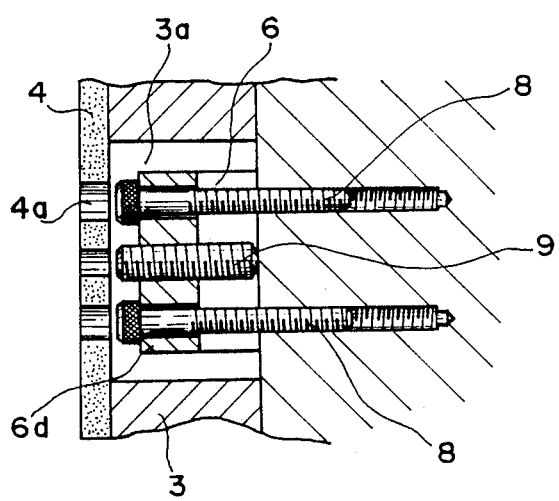
FIG. 3 is a plan view of FIG. 2.

FIGS. 2 and 3 illustrate the slide bearing holder insert 6 fitted into the recess 2b of the casing 2 in a side section and a horizontal section, respectively.

As clearly shown in the figures, a side plate 3 is fitted onto one of the open end portion of the casing 2 with a space void 3a being formed within the side plate 3.

The insert 6 is fitted into the recess 2b such that the flanged portion 6d of the insert is put into the space void 3a formed in the side plate 3 while the remaining part of the insert 6 is inserted into the recess 2b of the casing 2. Since the decreasing rate of the height in the longitudinal cross section of the insert is substantially the same as the decreasing rate of the depth of the recess 2b, the insert can be snugly fitted within the recess 2b while the bottom surface of the insert with a friction member may be kept flush with the bottom surface of the casing 2.

As shown in FIGS. 1 to 4, a plurality of horizontally arranged holes 6b, 6c are provided in the upright flange portion 6d of the slide bearing holder insert 6, while on the other hand, screw holes in the number corresponding to that of the holes 6b, 6c of said flange portion 6b may be provided on the end surface of the casing 2 at a level slightly above the opening of the inverted U-shaped recess of the casing 2, so that screw bolts 8, 9 or the like are inserted from outside into said flange holes 6b, 6c and further driven through the adjacently aligned screw holes of the casing 2 until they are securely fastened therein with the friction member 6 being suitably positioned relative to the underlying upper surface of the track rail 1.

Namely, by driving the respective screw bolts 8, 9 forwardly or rearwardly into the screw holes of the casing 2, the slide bearing holder insert 6 can be controllably moved accordingly within the rectangular-shaped recess 2b of the casing 2 until any desired intensity of sliding friction of the sliding bearing can be obtained. Before driving the screw bolts 8, 9, it is necessary to expose the screw flange holes 6b, 6c by removing plugs 4a or the like which have been fitted into the holes 4a provided in the sealing plate 4 at positions aligned with the flange holes 6b, 6c and then to insert a hexagonal bar spanner or the like thereinto to drive the screw bolts therethrough.

In the embodiment shown in FIGS. 2 and 3, the screw bolts include three bolts, viz., a central bolt 9 and the outside two bolts 8 which are used such that by driving the outside two bolts 8 only, the slide bearing holder insert 6 is longitudinally moved within the rectangular-shaped recess of the casing 2, whereas when the desired position of the insert has been reached therewithin, the central bolt 9 is then driven until its forward and is brought into abutment against the end wall of the casing 2 so as to secure the thus reached position by the insert 6.

Figure 4:
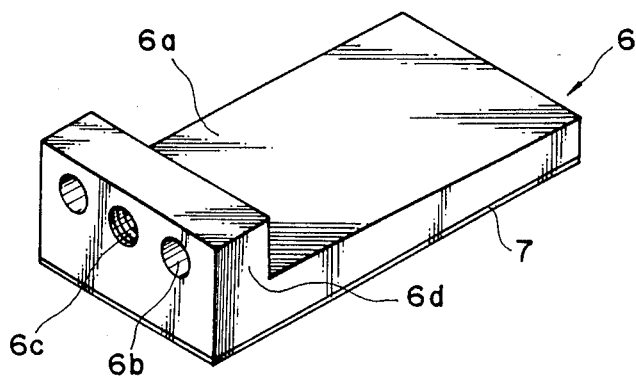
FIG. 4 is a perspective view of the slide friction bearing holder insert employed in the present invention.

FIG. 4 is a perspective view of the L-shaped slide bearing holder insert employed in the present invention having at one end an upright flange portion 6d with a plurality of holes 6b, 6c for receiving screw bolts 8 and 9.

According to the present invention, even if use is made, as rolling friction, of cylindrical rollers in the endless rectilinear motion rolling guide unit, by providing a friction member-retaining sliding bearing insert between the casing 2 and the track rail 1 in such a manner that the insert can be easily and freely moved longitudinally within the rectangular-shaped recess provided in the slide unit 2, a wide contact area and greater pressure between the friction member 7 and the upper surface of the track rail 1 can be obtained, thereby enabling to generate a greater braking power and thus effectively reduce the mechanical vibration.

I claim:

1. A rectilinear motion rolling guide unit comprising an elongated track rail having, on each of its sidewalls, longitudinally extending trackway means, a slide unit having a recess with an inverted U-shaped cross section in which the upper portion of said track rail is slidably inserted, on each of the inner sidewall surfaces of said recess being formed trackway means in facing relation with the above-mentioned track-rail side trackway means, and a plurality of cylindrical rollers present between the facing track-rail side and slide-unit side trackway means, which guide unit is characterized in that said slide unit includes a casing and opposing side panels fitted onto the opposing open ends of said casing with the inner sidewalls thereof being provided with the above-mentioned slide unit-side trackway means, while on the bottom surface of said casing forming a horizontal surface of said recess of the slide unit is provided a generally rectangular-shaped recess with an inwardly and gradually decreasing depth along the sliding direction of the slide unit relative to said track rail, a slide bearing holder insert having a L-shaped cross section is inserted and secured within said generally rectangular-shaped recess of the slide unit, said insert consisting of an upright flange portion at one end and a portion having a gradually decreasing height toward the other end so as to snugly conform to the above-mentioned recess of the slide unit having an inwardly and gradually decreasing depth so that said insert may be snugly fitted and secured into said rectangular-shaped recess of slide unit in a position displaceable relation with said recess along the sliding direction of said slide unit relative to said track rail, and a slide friction member is provided on the bottom surface of said L-shaped slide bearing holder insert.

2. The rectilinear motion rolling guide unit as claimed in the claim 1, wherein a plurality of holes are provided in said upright flange portion of said slide bearing holder insert, while screw holes in the number corresponding to the number of and at positions aligned with said holes of the upright flange portion are provided in the end wall of said casing with a plurality of position control screws being inserted therewithin so as to control the position of said slide bearing in the recess of the slide unit along the sliding direction of said slide unit relative to said track rail.

* * * * *